(12) United States Patent
Ahn et al.

(10) Patent No.: US 8,219,869 B2
(45) Date of Patent: Jul. 10, 2012

(54) METHOD OF RETRANSMITTING DATA IN A MOBILE COMMUNICATION SYSTEM

(75) Inventors: Joon Kui Ahn, Gyeonggi-do (KR); Bong Hoe Kim, Gyeonggi-do (KR); Young Woo Yun, Gyeonggi-do (KR); Dong Youn Seo, Gyeonggi-do (KR); Jung Hoon Lee, Gyeonggi-do (KR); Eun Sun Kim, Gyeonggi-do (KR); Hak Seong Kim, Gyeonggi-do (KR); Ki Jun Kim, Gyeonggi-do (KR); Suk Hyon Yoon, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 631 days.

(21) Appl. No.: 12/306,109

(22) PCT Filed: Jun. 22, 2007

(86) PCT No.: PCT/KR2007/003042
§ 371 (c)(1),
(2), (4) Date: May 29, 2009

(87) PCT Pub. No.: WO2007/148945
PCT Pub. Date: Dec. 27, 2007

(65) Prior Publication Data
US 2010/0005351 A1    Jan. 7, 2010

(30) Foreign Application Priority Data

Jun. 22, 2006 (KR) .......................... 10-2006-0056438
Jun. 30, 2006 (KR) .......................... 10-2006-0061026

(51) Int. Cl.
*G08C 25/02* (2006.01)
(52) U.S. Cl. ........................................................ 714/748
(58) Field of Classification Search .................... 714/748
See application file for complete search history.

(56) References Cited

U.S. PATENT DOCUMENTS

| 7,310,761 | B2* | 12/2007 | Cho et al. ........................ 714/748 |
| 7,808,906 | B2* | 10/2010 | Rao et al. ........................ 370/235 |
| 7,823,039 | B2* | 10/2010 | Park et al. ....................... 714/748 |
| 2002/0174395 | A1* | 11/2002 | Chen et al. ..................... 714/748 |

(Continued)

FOREIGN PATENT DOCUMENTS

EP    1168703    1/2002

(Continued)

OTHER PUBLICATIONS

Chen, et al., "Theoretical Analysis of GPRS Throughput and Delay", Sep. 2003.

*Primary Examiner* — Yolanda L Wilson
(74) *Attorney, Agent, or Firm* — Lee, Hong, Degerman, Kang & Waimey (57) ABSTRACT

A communication method according to an automatic repeat request scheme in a mobile communication system includes transmitting a retransmission packet per certain time period (periodically) in response to NACK of a first user equipment related to a first packet transmitted within a frame group consisting of a plurality of successive frames, and transmitting a retransmission packet non-periodically in response to NACK of a second user equipment related to a second packet transmitted within the frame group.

16 Claims, 9 Drawing Sheets

U.S. PATENT DOCUMENTS

| | | | |
|---|---|---|---|
| 2003/0009717 A1* | 1/2003 | Fukushima et al. | 714/748 |
| 2003/0131300 A1* | 7/2003 | Park et al. | 714/748 |
| 2004/0163024 A1* | 8/2004 | Kawai et al. | 714/748 |
| 2005/0216812 A1* | 9/2005 | Leon et al. | 714/748 |
| 2005/0226159 A1 | 10/2005 | Terry et al. | |
| 2006/0059399 A1* | 3/2006 | Hu et al. | 714/748 |
| 2007/0147250 A1* | 6/2007 | Druke et al. | 370/235 |
| 2009/0119565 A1* | 5/2009 | Park et al. | 714/748 |

FOREIGN PATENT DOCUMENTS

| | | |
|---|---|---|
| EP | 1414178 | 4/2004 |
| JP | 2001060934 | 3/2001 |
| JP | 2003179581 | 6/2003 |
| JP | 2003179974 | 6/2003 |
| JP | 2005020499 | 1/2005 |
| JP | 2005110294 | 4/2005 |
| JP | 2006054721 | 2/2006 |
| JP | 2007522715 | 8/2007 |
| KR | 1020030055331 | 7/2003 |
| WO | 2005/008947 | 1/2005 |
| WO | 2005/071874 | 8/2005 |
| WO | 2006030478 | 3/2006 |

* cited by examiner

METHOD OF RETRANSMITTING DATA IN A MOBILE COMMUNICATION SYSTEM

CROSS-REFERENCE TO RELATED APPLICATIONS

This application is the National Stage filing under 35 U.S.C. 371 of International Application No. PCT/KR2007/003042, filed on Jun. 22, 2007, which claims the benefit of earlier filing date and right of priority to Korean Application No. 10-2006-0056438, filed on Jun. 22, 2006, and Korean Application No. 10-2006-0061026, filed on Jun. 30, 2006.

TECHNICAL FIELD

The present invention relates to a mobile communication system, and more particularly, to a communication method according to an automatic repeat request (ARQ) scheme in a mobile communication system.

BACKGROUND ART

Figure 1:
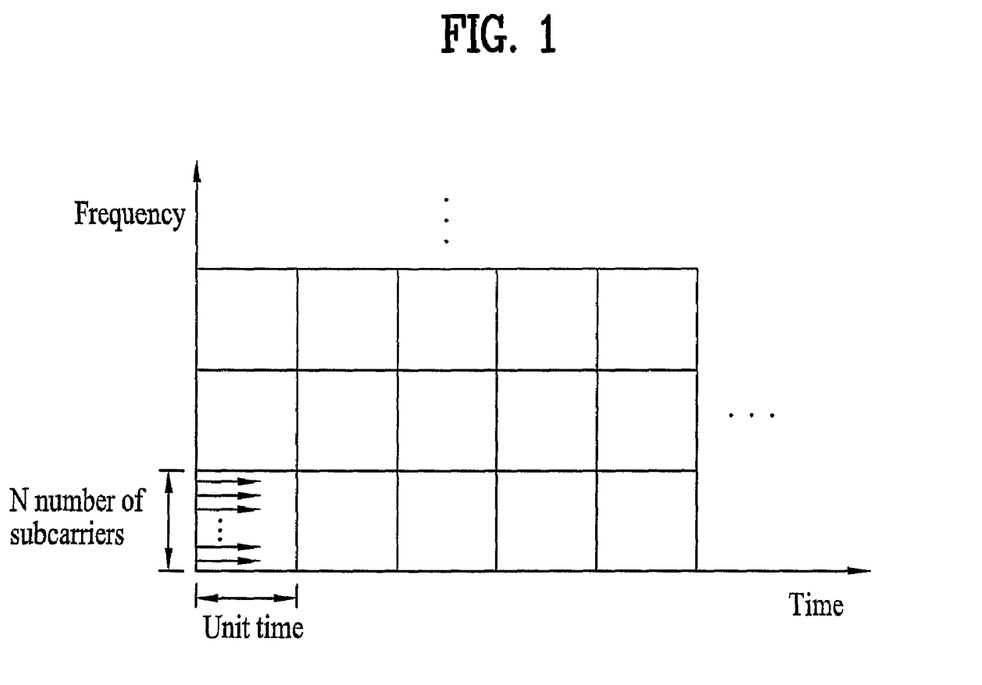
FIG. 1 is a conceptional view illustrating time-frequency resource blocks used in an orthogonal frequency division multiplexing (OFDM) system.

An orthogonal frequency division multiplexing (OFDM) system and its similar system define resource blocks defined in a time-frequency domain and use the resource blocks as a single unit. FIG. 1 illustrates an example of resource blocks defined in a time-frequency domain, wherein one square block means one resource block, and each resource block is comprised of N number of subcarriers (N is a random number) and M number of subframes (or time durations) (M is a random number).

Meanwhile, in a downlink, a base station allocates at least one resource block to a specific user equipment selected in accordance with a given scheduling rule and transmits data through a corresponding resource block. Also, in an uplink, if the base station selects a specific user equipment in accordance with a given scheduling rule and allocates a resource block to the corresponding user equipment, the corresponding user equipment transmits data to the base station through the allocated resource block.

At this time, if frame loss or damage occurs in the data transmitted to the downlink or the uplink, there are provided an automatic repeat request (ARQ) scheme and a hybrid ARQ (HARQ) method to correct a corresponding error.

According to the ARQ scheme, a receiving side detects a data transmission error occurring on a transmission channel, and if a transmission error occurs in data, requests a transmitting side of retransmission to correct the error. Accordingly, an object of the ARQ scheme is to improve reliability by requesting retransmission of data until the data are transmitted without error if a data transmission error occurs.

The HARQ scheme is obtained by combination of the ARQ scheme and FEC (Forward Error Correction) method. The FEC method corrects an error by using an error correcting code, wherein the error is generated by the channel environment. Reliability in data transmission and data throughput in a mobile communication system can be improved by the HARQ scheme. Particularly, the HARQ scheme is performed between physical layers of the transmitting side and the receiving side, whereby delay in packet transmission can be reduced and transmission efficiency can be improved.

The HARQ scheme is advantageous in that although the receiving side transmits NACK to the transmitting side if it fails to successfully decode a frame, the receiving side stores a frame which is previously received in, a buffer for a certain time period and if the corresponding frame is retransmitted, combines the retransmitted frame with the previously received frame to improve a receiving success rate.

Figure 2:
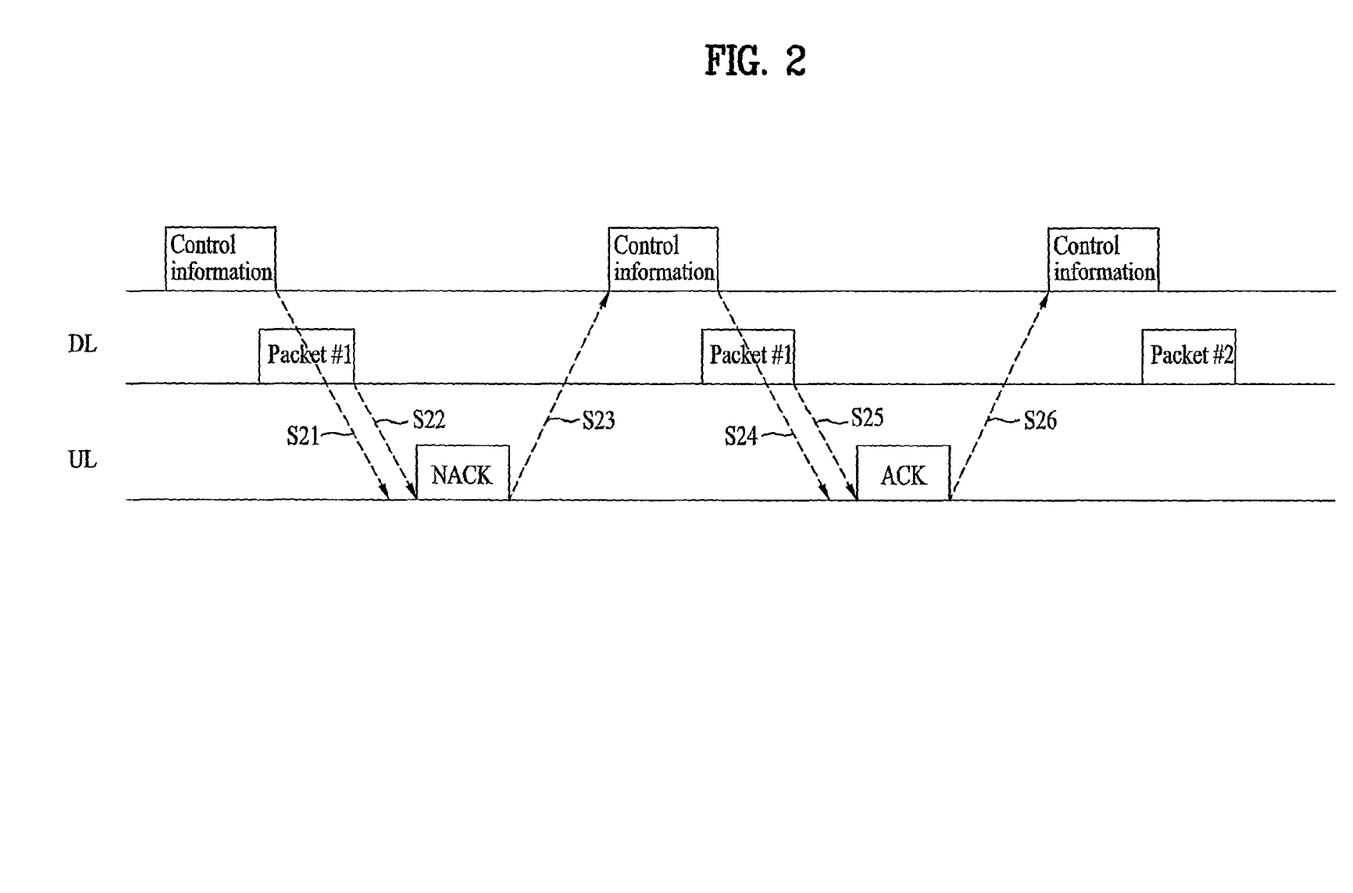
FIG. 2 illustrates HARQ scheme according to the related art.

FIG. 2 illustrates the HARQ scheme according to the related art. Referring to FIG. 2, the base station determines a user equipment which will receive a packet and transmission formats (coding rate, modulation mode, data capacity, etc.) used for the packet to be transmitted to the user equipment and transmits control information including the transmission formats to the user equipment through a downlink control channel (S21). At this time, the base station transmits a corresponding data packet to the user equipment (S22). The transmission formats mean combination of at least two of transmission parameters (for example, data bits included in one frame, modulation mode, channel coding rate, channel coding mode, etc.) used in data transmission of the base station or the user equipment. Also, a set of the transmission formats is a set which includes a plurality of different transmission formats, and a transmission format index is an identification number to identify each transmission format within the transmission format set.

The user equipment identifies a transmission format of a packet to be transmitted to itself and a transmission timing point by receiving a downlink control channel and receives a corresponding packet through the transmission format and the transmission timing point. After receiving the packet, the user equipment performs decoding of the packet data. If the user equipment fails to decode the packet data, the user equipment transmits a NACK signal to the base station (S23). The base station which has received the NACK signal senses that packet transmission to the user equipment has been failed and transmits control information for retransmission packet to the user equipment (S24). Then, the base station timely transmits the retransmission packet (S25). The retransmission packet can be transmitted in either the same format as that of the packet transmitted in the step S22 or a new transmission format.

If the user equipment which has received the retransmission packet successfully performs decoding, the user equipment transmits an ACK signal to the base station (S26). The base station which has received the ACK signal senses that packet transmission to the user equipment has been successfully performed and performs the next packet transmission. At this time, the user equipment combines the retransmission packet with the previous packet whose decoding has been failed in various methods such as chase combining and incremental redundancy (IR) combining to perform decoding again.

The aforementioned HARQ scheme can be classified into a channel-adaptive HARQ scheme and a channel-non-adaptive HARQ scheme depending on whether to change an allocation resource in accordance with the channel status during frame retransmission. The channel-non-adaptive HARQ scheme means that retransmission is performed for frame modulation or the number of allocation resource blocks in the same status as that of initial transmission regardless of the channel status. Also, the HARQ scheme can be classified into a chase combining method and an incremental redundancy method depending on whether to transmit a packet having the same format as that of a packet for initial transmission during frame retransmission. The chase combining method which transmits the same packet as that for initial transmission is more advantageous than the incremental redundancy method in that it can be realized more simply.

Figure 3:
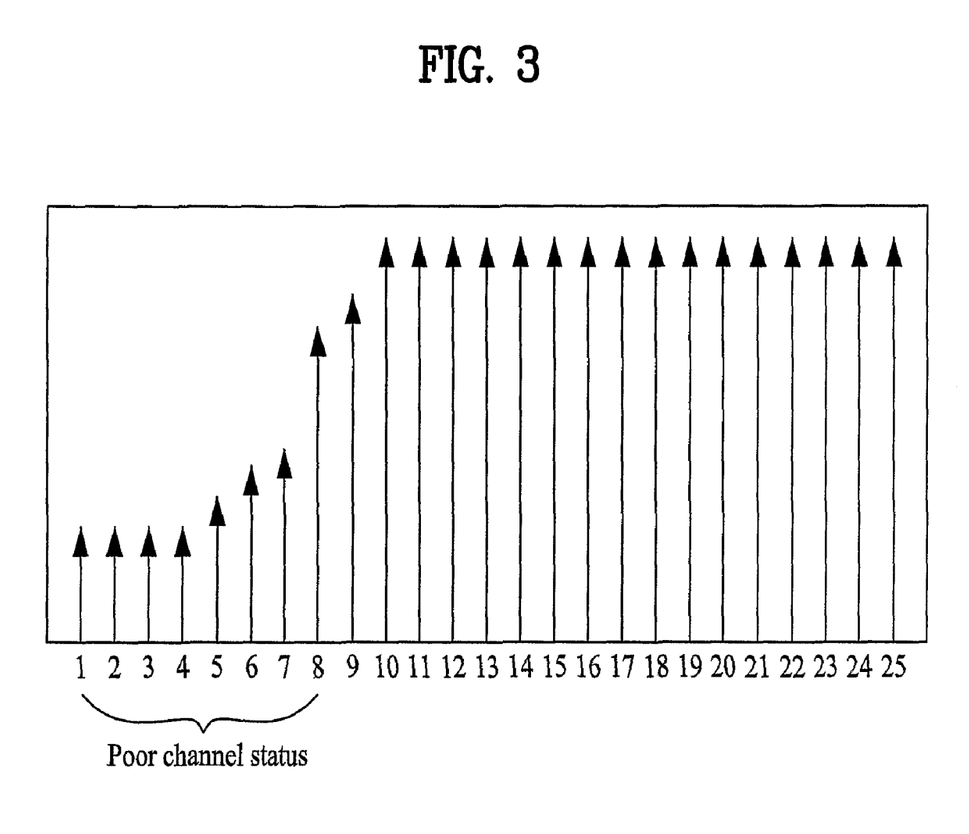
FIG. 3 is a conceptional view illustrating that a channel status of specific subcarriers within a resource block is poor.

Meanwhile, if a frequency band occupied by one resource block is sufficiently great in case of frame retransmission, the statuses of respective channels constituting a frequency band within the corresponding resource block may be different from each other. Also, if a coherence time is sufficiently greater than a time interval of retransmission, a channel environment of a frequency domain remains unchanged for a time period of retransmission. For reference, the coherence time represents a time when a channel environment is uniformly maintained for a time period or a time when the channel environment remains unchanged for a certain time period. FIG. 3 illustrates that some subcarriers (first to seventh subcarriers) of a resource block comprised of 25 subcarriers are maintained under the poor channel status in a state that the coherence time is greater than the time interval of retransmission.

In other words, if specific frequency bands (frequency bands of first to seventh subcarriers) within the resource block are under a deep fade status, the corresponding frequency bands are maintained for a time period of retransmission for the above reason. In this case, if the channel-adaptive HARQ scheme and the chase combining method are used for frame retransmission, error continues to occur in the deep fade part. For this reason, a problem occurs in that the corresponding part cannot be corrected through combining in spite of retransmission of several times.

To provide high speed data service of large capacity in a mobile communication system and simplify a structure of a channel, models that can perform packet communication and voice communication through one channel have been developed. In this case, packet data and voice data have different features from each other. In other words, since the voice data are smaller than the packet data in their capacity and are generated relatively periodically at low speed, their occurrence statistical data are close to a circuit. Accordingly, it is necessary to develop a new method considering each feature of the packet data and the voice data when the HARQ scheme is applied to the packet data and the voice data transmitted through one channel.

DISCLOSURE OF THE INVENTION

Accordingly, the present invention is directed to a communication method according to an automatic repeat request scheme in a mobile communication system, which substantially obviates one or more problems due to limitations and disadvantages of the related art.

An object of the present invention is to provide a communication method according to an automatic repeat request scheme in a mobile communication system, in which packet service and voice service are provided through one channel to adapt to their features.

Another object of the present invention is to provide a communication method according to an automatic repeat request scheme in a mobile communication system, in which the quantity of control information required for the scheme can be reduced.

Still another object of the present invention is to provide a communication method in a mobile communication system, in which both advantages of a non-synchronized HARQ scheme and advantages of a synchronized HARQ scheme can be obtained along with decrease of complexity in a user equipment.

Further still another object of the present invention is to provide a communication method in a mobile communication system, in which the quantity of control information required for the ARQ scheme can be reduced.

Further still another object of the present invention is to provide a method of improving a receiving success rate by performing predetermined data processing for retransmission data and dispersing a part where error occurs to minimize instantaneous noise loss in a system which combines buffered data with retransmission data to improve the receiving success rate.

To achieve these objects and other advantages and in accordance with the purpose of the invention, as embodied and broadly described herein, a communication method according to an automatic repeat request scheme in a mobile communication system comprises transmitting a retransmission packet periodically per a time period in response to a negative acknowledgement (NACK) from a first user equipment for a first packet transmitted within a frame group comprising a plurality of successive frames, and transmitting a retransmission packet non-periodically in response to NACK from a second user equipment for a second packet transmitted within the frame group.

In another aspect of the present invention, a communication method according to an automatic repeat request scheme in a mobile communication system comprises transmitting a retransmission packet periodically or non-periodically in response to NACK from a receiving side for a packet transmitted within a first sub-group including at least one frame among a frame group comprising a plurality of successive frames, and transmitting a retransmission packet non-periodically in response to NACK from the receiving side for a packet transmitted within another frame other than the first sub-group among the frame group.

In still another aspect of the present invention, a communication method according to an automatic repeat request scheme in a mobile communication system comprises transmitting NACK to a base station in response to a first packet received within a frame group including a plurality of successive frames, transmitting NACK to the base station in response to a second packet received within the frame group, receiving a retransmission packet for the first packet after a lapse of a certain time period, receiving control information for a retransmission packet for the second packet, and receiving the retransmission packet for the second packet by using the control information.

In further still another aspect of the present invention, a communication method according to an automatic repeat request scheme in a mobile communication system comprises transmitting a packet to a receiving side, receiving NACK from the receiving side in response to the packet, and transmitting a retransmission packet to the receiving side, characterized in that a retransmission packet is transmitted periodically per certain time period for at least one frame within a frame group including a plurality of successive frames, and that a retransmission packet is transmitted non-periodically in response to NACK from the receiving side for at least one another frame within the frame group.

In further still another aspect of the present invention, a method of retransmitting data in a communication system using multiple carriers comprises transmitting initial data processed by first data processing for code rearrangement to a receiving side, and retransmitting the same data to the receiving side after performing second data processing for code rearrangement for the same data if the initial data is not received in the receiving side successfully.

In further still another aspect of the present invention, a method of receiving retransmitted data method in a communication system using multiple carriers comprises performing first data processing to decode data transmitted from a transmitting side, receiving the same data retransmitted from the transmitting side if decoding of the data is not performed successfully in spite of the first data processing, and performing second data processing to decode the data retransmitted from the transmitting side.

In further still another aspect of the present invention, a transmitter for retransmitting data in a communication system using multiple carriers comprises a data processor performing first data processing and second data processing for code rearrangement, a controller controlling operation to allow initial data to be processed by the first data processing, and controlling operation to allow the initial data to be processed by the second data processing if the initial data is not received in a receiving side successfully, and a transmitter performing transmission of the initial data and retransmission of the same data.

In further still another aspect of the present invention, a receiver for receiving retransmitted data in a communication system using multiple carriers comprises a data processor performing first data processing and second data processing for decoding through code rearrangement, a controller controlling operation to allow initial data transmitted from a transmitting side to be processed by the first data processing, and controlling operation to allow the same data retransmitted from the transmitting side to be processed by the second data processing if decoding is not performed normally in spite of the first data processing, and a receiver receiving the initial data the retransmitted same data.

BEST MODE FOR CARRYING OUT THE INVENTION

Hereinafter, structures, operations, and advantages of the present invention will be understood readily by the preferred embodiments of the present invention, examples of which are illustrated in the accompanying drawings.

Figure 4:
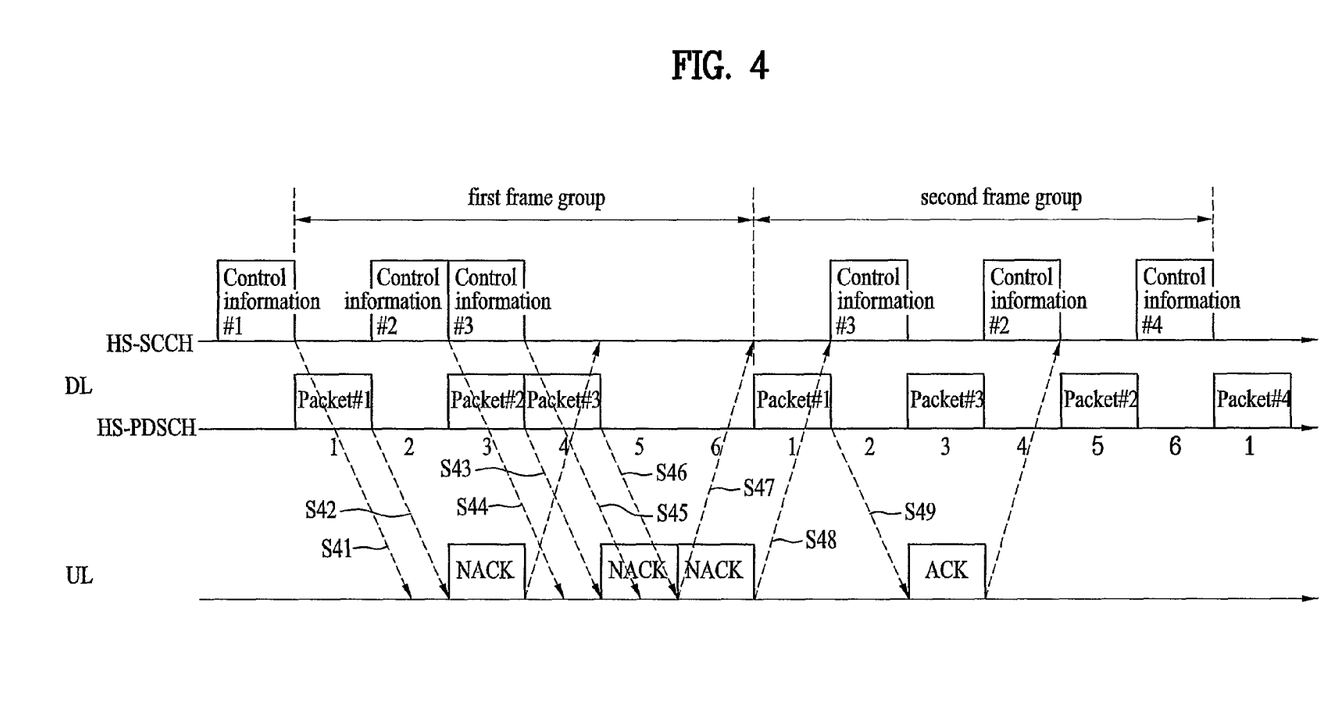
FIG. 4 illustrates the preferred embodiment of the present invention.

FIG. 4 illustrates the preferred embodiment of the present invention. In the embodiment of FIG. 4, technical features of the present invention are applied to 3GPP HSDPA (High Speed Downlink Packet Access) system.

HSDPA improves performance of an existing downlink shared channel (DSCH) to provide data transmission service of high speed of maximum 10 Mbps to a downlink. Examples of wireless access techniques adopted in a physical layer of the HSDPA system include link adaptation (LA) method and HARQ scheme. The LA method uses a modulation and coding scheme (MCS) suitable for the channel status whenever packet (or sub-packet) is transmitted. A physical layer channel of HSDPA includes HS-PDSCH (HSDPA Physical DSCH) and HS-SCCH (HSDPA Shared Physical Control Channel). The HS-SCCH is to transmit control information for support of the HS-PDSCH.

The HARQ scheme can be classified into Synchronous HARQ and Asynchronous HARQ depending on how the relation between a retransmission timing point of packet and its previous transmission timing point is defined.

According to the synchronous HARQ scheme, a retransmission timing point of a specific packet is fixed as a relative time interval with respect to a previous transmission timing point. For example, if it is defined that retransmission is allowed once per 6 frames, when transmission of a specific packet to a specific user equipment is failed, retransmission of the packet is performed after 5 frames. At this time, since 5 frames are required to transmit a retransmission packet to the user equipment, to transmit different packets to the user equipment within frames on standby for retransmission, the user equipment should independently operate six different HARQ processes. In other words, even in case that the user equipment has failed to receive initial transmission of the first packet and is on standby for retransmission of the first packet, the user equipment can receive initial transmission of another packet. In the synchronous HARQ scheme, a plurality of HARQ processes are periodically repeated in the same order. The synchronous HARQ scheme is advantageous in that if a packet type and a transmission format for retransmission are previously defined, since the user equipment knows a previously defined retransmission timing point of a specific packet when it fails to receive the packet, a base station does not need to transmit a downlink control channel indicating the transmission format of the retransmission packet.

In the asynchronous HARQ scheme, the base station can perform packet retransmission regardless of a previous transmission timing point of the corresponding packet. When the user equipment fails to receive a specific packet, since the user equipment does not know when the base station transmits a retransmission packet, the base station should notify information indicating the retransmission packet for the user equipment through a downlink control channel even in case of transmission of the retransmission packet. The asynchronous HARQ scheme is advantageous in that since the base station can freely define a packet retransmission timing point for a plurality of user equipments, the degree of freedom of scheduling is maximized to maximize scheduling gain.

In the HARQ scheme basically adopted in the HSDPA system, data is transmitted to the downlink in an asynchronous mode, and its response information is transmitted in a synchronous mode. In other words, each downlink data can be transmitted at any time depending on a scheduler, and its response signal can be transmitted to an uplink within a certain time period.

In the embodiment of FIG. 4, six successive frames transmitted through the HS-PDSCH are defined as one frame group, wherein the first frame (frame #1) transmits a packet by means of the synchronous HARQ scheme and the other frames transmit a packet by means of the asynchronous HARQ scheme. In other words, a retransmission packet of the packet transmitted from the first frame of the frame group is transmitted periodically, and the second to sixth frames freely determine a transmission timing point of the retransmission packet depending on scheduling of the base station. This will be described in more detail.

The base station transmits control information (control information #1) of the first packet (packet #1) to the user equipment through the HS-SCCH (S41). The control information includes identifier of a user equipment (UE ID) which is a destination of the first packet and identifier of a transmission format which will be used during transmission of the first packet. In addition, examples of the control information include HARQ process identity information, New Data Indicator and Redundancy Version. The HARQ process identity information is information as to whether the base station has transmitted data by using which process among several HARQ processes. 'New Data Indicator' is an indicator which indicates that the first packet is an initial transmission packet. 'Redundancy Version' is information which identifies 'Redundancy' of coding data additionally transmitted in the HARQ scheme. Particularly, considering that the synchronous HARQ scheme mainly uses voice service whose data capacity is relatively small and which does not need various transmission formats, entire or some of information constituting the control information are common for all frames operated in the synchronous HARQ scheme, whereby control information transmitted for the first packet can be simplified. For example, it is previously set that the first frame of each frame group uses one or few transmission formats and the user equipment previously assumes the one or few transmission formats and tries decoding of the one or few transmission formats to omit transmission of related information. For another example, a transmission format of a frame to which the synchronous HARQ scheme is applied may be more simplified than a transmission format of a frame to which the asynchronous HARQ scheme is applied, so as to reduce bits of identification information of the transmission format.

The user equipment corresponding to the UE ID identifies that the packet will be transmitted to the user equipment through the control information and obtains information required for reception of the first packet, such as transmission format which will be used for the packet, HARQ process identity information, and 'New Data Indicator.' The base station transmits the initial transmission packet (packet #1) through the first frame of the first frame group on the HS-PDSCH which is a downlink physical channel. The initial transmission packet means that the base station first transmits a packet to the user equipment, and is distinguished from a retransmission packet transmitted after reception of NACK signal from the user equipment.

The base station transmits the packet #1 to the user equipment through the first frame of the first frame group (S42). The user equipment receives the packet #1 and decodes the same. If the user equipment fails to perform decoding due to error of the packet A1, it transmits NACK to the base station (S43). The base station which has received NACK of the packet #1 from the user equipment transmits a retransmission packet of the packet #1 to the user equipment (S49). Since it is designated that the first frame (frame #1) of each frame group uses the synchronous HARQ scheme, the retransmission packet of the packet #1 is transmitted to the first frame of the second frame group which is the next frame group of the first frame group. Since the user equipment knows that the synchronous HARQ scheme is applied to the first frame of each frame group, the user equipment can previously know that the retransmission packet of the packet #1 is received in the first frame (frame #1) of the second frame group and prepare it. Accordingly, the HARQ process identity information, 'Redundancy Version' and the transmission format for transmission of retransmission packet are previously determined depending on the number of retransmission times, so that control information to be transmitted through the HS-SCCH for transmission of the retransmission packet may be reduced remarkably or HS-SCCH transmission may be omitted.

In FIG. 4, it is set that the asynchronous HARQ scheme is applied to the other frames excluding the first frame of each frame group. Accordingly, the base station transmits the retransmission packet in accordance with scheduling of a base station scheduler regardless of a packet transmission timing point of a previous packet of the retransmission packet if the other frames transmit the retransmission packet. In this case, since the user equipment cannot know the transmission timing point of the retransmission packet transmitted from the other frames, the base station should transmit control information for retransmission packet to the user equipment even in case of transmission of retransmission packet from the other frames. In FIG. 4, the base station transmits control information (control information #2 and control information #3) of packet #2 and packet #3 from the third frame (frame #3) and the fourth frame (frame #4) of the first frame group on the HS-PDSCH through the HS-SCCH (S43 and S45). Afterwards, the base station respectively transmits the packet #2 and the packet #3 through the HS-PDSCH (S44 and S46).

The user equipment receives the packet #2 and the packet #3 from the base station in accordance with the control information #2 and the control information #3. Then, the user equipment decodes the packet #2 and the packet #3. As a result, if the user equipment fails to successfully decode the packet #2 and the packet #3, the user equipment transmits NACK to the base station in response to the packet #2 and the packet #3 (S47 and S48). If the base station receives NACK in response to the packet #2 and the packet #3, the base station should transmit the retransmission packet of each of the packet #2 and the packet #3. At this time, the transmission timing point of the retransmission packet of the packet #2 and the packet #3 is determined depending on downlink scheduling of the base station scheduler, In FIG. 4, it is determined that the retransmission packet of the packet #2 is transmitted to the fifth frame (frame #5) of the second frame group while the retransmission packet of the packet #3 is transmitted to the third frame (frame #3) of the second frame group.

The base station transmits the control information #2 and the control information #3, which respectively correspond to the packet #2 and the packet #3, through the HS-SCCH before transmitting the retransmission packet of each of the packet #2 and the packet #3. The control information #2 and the control information #3 may include identifier of the user equipment to which the retransmission packets of the packet #2 and the packet #3 will be transmitted, indicator information which indicates that the retransmission packets are retransmission packets of the packet #2 and the packet #3, identifier of a transmission format used for the retransmission packets, HARQ process identity information, New Data Indicator, and Redundancy Version.

In the embodiment of FIG. 4, the base station can determine the frame to which the synchronous HARQ will be applied and the frame to which the asynchronous HARQ will be applied within one frame group, and notifies the user equipment of information as to whether the synchronous HARQ is applied to which frame or the asynchronous HARQ is applied to which frame, through uplink signaling. To this end, it is preferable that a frame group of a single length and a start point of the frame group are applied to all user equipments in the HSDPA system so that a frame indicator within each frame group is generated to efficiently arrange frames for synchronous HARQ operation of a plurality of user equipments. A system frame number (SFN) may be used to generate the frame indicator.

If a frame to which the synchronous HARQ will be applied is determined within the frame group, the frame may be determined in common for all user equipments currently connected with the base station, the frame may be determined for each user equipment group which includes at least two user equipments, or the frame may be determined individually for each user equipment. In other words, the frame may be determined in such a manner that the synchronous HARQ scheme is applied to at least one frame within the frame group for all user equipments currently connected with the base station, different frames may be used for each user equipment in a synchronous mode, or the synchronous HARQ scheme may be applied to different frames for each user equipment. For example, in FIG. 4, the frames can be allocated in such a manner that the synchronous HARQ scheme is applied to the first frame of each frame group to provide voice service to the first user equipment while the asynchronous HARQ scheme is applied to the other frames (frame #2 to frame #6) to provide packet service to the other user equipments within the base station.

In another preferred embodiment of the present invention, a fist sub-group to which the synchronous HARQ scheme is applied and a second sub-group to which the asynchronous HARQ scheme is applied within the frame group on the HS-PDSCH are separately used, wherein the asynchronous HARQ operation is allowed for the second sub-group while the synchronous HARQ operation or the asynchronous HARQ operation is allowed for the first sub-group depending on selection of the base station scheduler. For example, in FIG. 4, the asynchronous HARQ operation is performed for the second frame (frame #2) to the sixth frame (frame #6) within each frame group while the synchronous HARQ operation or the asynchronous HARQ operation is performed for the first frame (frame #1) depending on selection of the base station. At this time, it is preferably limited that the synchronous HARQ operation and the asynchronous HARQ operation are not simultaneously performed for one user equipment on the frame corresponding to the first sub-group to reduce receiving complexity of the user equipment.

In the second embodiment, since the user equipment cannot know whether the base station scheduler performs the synchronous HARQ operation or the asynchronous HARQ operation for the frames included in the first sub-group, a method of identifying this should be considered. For example, the base station can identify whether the base station scheduler performs the synchronous HARQ operation or the asynchronous HARQ operation for the frames included in the first sub-group, through control information transmitted through the HS-SCCH, the transmission format of the HS-SCCH, or channel code such as OVSF (Orthogonal Variable Spreading Function) code used for HS-SCCH or HS-PDSCH. For example, if a specific OVSF code is used for the HS-SCCH or the HS-PDSCH, it is set that the synchronous HARQ operation is performed for the packet transmitted to the corresponding frame. If another channel code is used for the HS-SCCH or the HS-PDSCH, it is set that the asynchronous HARQ operation is performed for the packet transmitted to the corresponding frame. Thus, the user equipment can identify whether the base station scheduler performs the synchronous HARQ operation or the asynchronous HARQ operation for the frames included in the first sub-group.

Although the embodiment of FIG. 4 exemplarily illustrates the HSDPA system which uses the HARQ scheme, it will be apparent to those skilled in the person that technical features of the present invention can be applied to another communication system which uses various kinds of ARQ schemes. Also, the term, 'packet,' which is used herein, may be replaced with 'sub-packet' as the case may be. In other words, in applying the HARQ scheme, if one packet which has undergone channel coding consists of a plurality of 'sub-packets' to perform retransmission in accordance with NACK of the receiving side, each sub-packet can be transmitted as the retransmission packet.

Figure 5A:
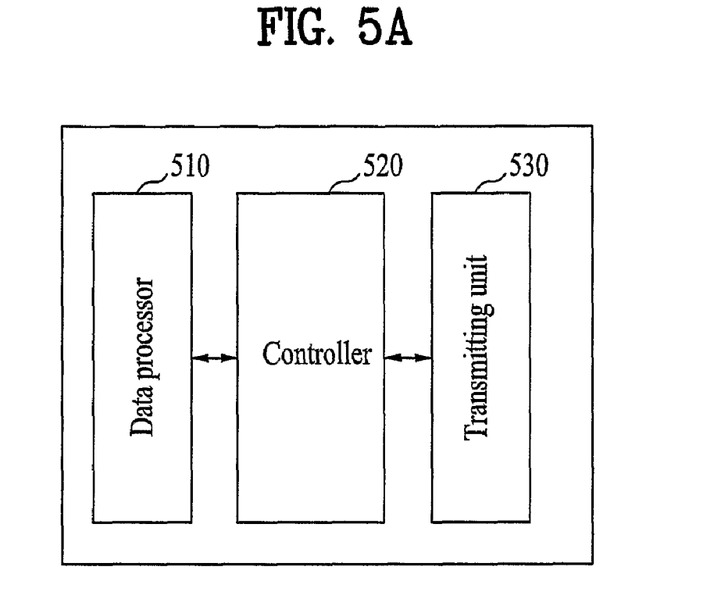
FIG. 5A and FIG. 5B are block diagrams illustrating a transmitting apparatus and a receiving apparatus for realizing a data retransmission method according to one embodiment of the present invention.
Figure 5B:
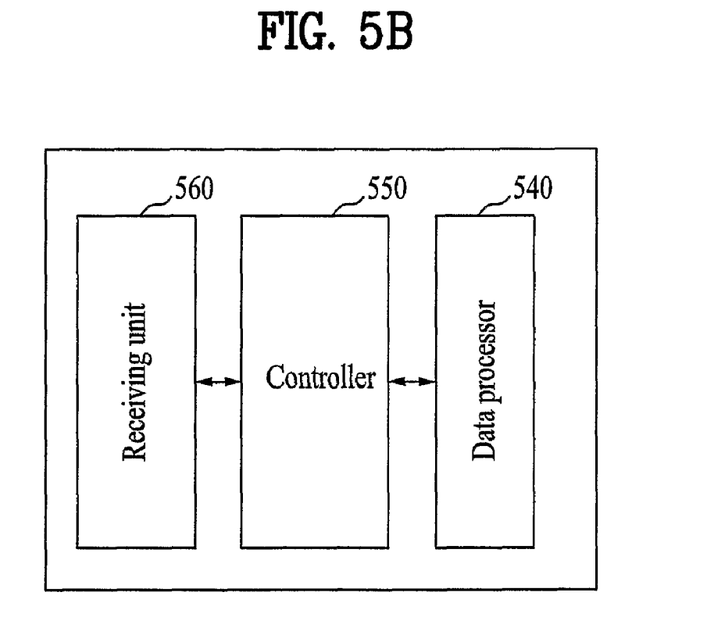

FIG. 5A and FIG. 5B are block diagrams illustrating a transmitting apparatus and a receiving apparatus for realizing a data retransmission method according to one embodiment of the present invention.

A data processor 510 of the transmitting apparatus performs first data processing and second data processing to minimize instantaneous noise loss. In this case, an example of data processing for minimizing loss due to instantaneous noise includes interleaving.

One of advantages of a digital communication system can perform transmission without distortion of data if 0 and 1 are clearly distinguished from each other during data transmission even though data transmission is affected by noise. If 0 and 1 are switched over each other due to instantaneous noise, there is a drawback in that error more serious than that of an analog communication system occurs. Accordingly, to reinforce tolerance to instantaneous noise, the digital communication system performs predetermined data processing before transmitting data to the receiving side. Interleaving is mainly used to minimize such instantaneous noise loss. Interleaving rearranges code arrangement of transmission data in a certain unit to restore some bits in the middle of a data stream, which are damaged by instantaneous noise. There exist various examples of interleaving, and of them, block repeater and block interleaving are mainly used.

Block repeater is the easiest method to reduce loss of instantaneous noise, and means that a signal 1011 is transmitted as 111 000 111 111 repeatedly three times or a predetermined number of times in each signal unit. Block interleaving means that digital data streams are arranged in a certain block unit and then column and row are switched over each other during data transmission. The principle of block interleaving will be described with reference to FIG. 6.

Figure 6:
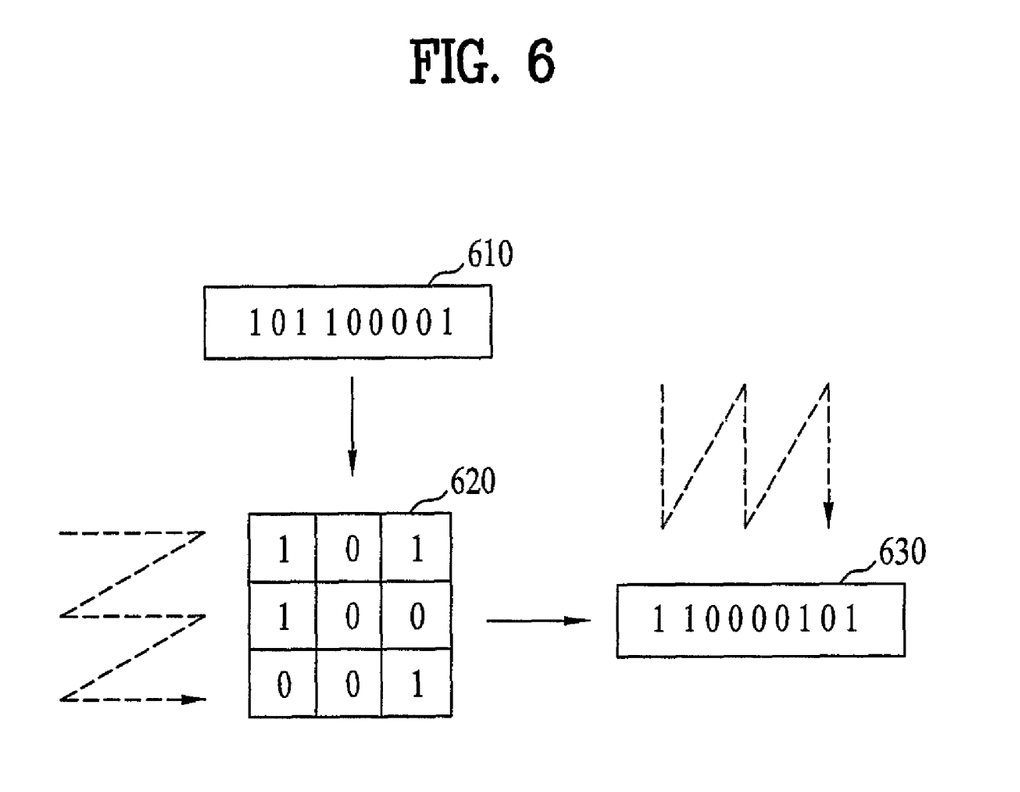
FIG. 6 is a conceptional view illustrating the principle of block interleaving.

In other words, after a transmission data stream 610 is arranged in a matrix 620 of a size of 3×3 in a horizontal zigzag manner, the corresponding matrix 620 is read out in a vertical zigzag manner to obtain a rearranged data stream 630. After arranging received data by a block unit in a state that the receiving side knows size information of the block, the receiving side arranges the data by switching over column and row each other in reverse order of interleaving to restore signal. This de-interleaving procedure enables dispersion of a bit error.

In one embodiment of the present invention, although the block repeater and/or the block interleaving may be used for data processing to minimize loss due to instantaneous noise, the present invention is not limited to the block repeater and/or the block interleaving. For example, the block repeater and/or the block interleaving may be performed in such a manner that a unit of the interleaving is expanded to two or more bits, or interleaving of another pattern may be used.

Meanwhile, it is preferable that an interleaving pattern for the first data processing is different from an interleaving pattern for the second data processing. It is also preferable that patterns of interleaving used for the second data processing are also changed every time as data retransmission is repeated. This is to allow a specific bit stream of transmission data not to be concentrated on a specific frequency band of a resource block for data transmission if deep fading occurs in the corresponding frequency band when it is assumed that channel-non-adaptive HARQ and chase combining are used for error correction control in the embodiment of the present invention. Accordingly, the transmitting apparatus of the present invention should be provided with data processing algorithms (or interleaving algorithms of various patterns) of various patterns, and is preferably provided with a scheduling policy as to whether to apply each data processing algorithm in accordance with which order as data retransmission is performed. Also, the scheduling policy should be provided in the receiving apparatus for desirable data decoding, Meanwhile, interleaving algorithms of various patterns may only be provided in the transmitting apparatus and the receiving apparatus, and the interleaving patterns may be changed randomly without a separate scheduling policy for pattern change. In this case, the transmitting apparatus should include information of the changed interleaving pattern in some of retransmitted data after changing the interleaving pattern or transmit information of the changed interleaving pattern to the receiving apparatus through separate signaling.

Hereinafter, the HARQ scheme will be described in more detail.

As described above, various examples of the HARQ scheme include channel-adaptive HARQ/channel-non-adaptive HARQ and chase combining/incremental redundancy.

In the channel-non-adaptive HARQ, frame modulation or the number of available resource blocks during retransmission is performed as it is determined during initial transmission. The channel-adaptive HARQ varies the above parameters depending on the current channel status. For example, according to the channel-non-adaptive HARQ, if the transmitting side transmits data by using eight resource blocks in case of initial transmission, the transmitting side transmits the data by using eight resource blocks even in case of retransmission. According to the channel-adaptive HARQ, even though the transmitting side transmits data by using eight resource blocks in case of initial transmission, the transmitter retransmits the data by using resource blocks more than or less than eight resource blocks depending on the channel status.

Furthermore, the HARQ scheme can be classified into chase combining and incremental redundancy depending on which packet is transmitted during retransmission. According to the chase combining, the transmitting side retransmits a packet having the same format as that used for initial transmission if error occurs. According to the incremental redundancy, the transmitting side retransmits a packet having a format different from that used for initial transmission.

In addition, the HARQ scheme can be classified into synchronous HARQ and asynchronous HARQ depending on whether retransmission performed after transmission failure of initial data is performed in a given timing. Assuming that retransmission is performed per fourth timing after initial transmission is failed, since this is previously promised between the base station and the user equipment, it is not necessary to notify the timing between the base station and the user equipment. However, if the transmitting side receives NACK, the transmitting side retransmits data (or frame) in a given timing until the transmitting side receives ACK. By contrast, the asynchronous HARQ is realized in such a manner that a retransmission timing is newly scheduled per corresponding case or additional signaling for adjusting the retransmission timing is separately set. Since the synchronous HARQ is mainly associated with the channel-non-adaptive HARQ, the synchronous HARQ is preferably used in the present invention. The asynchronous HARQ may be used depending on the communication environment.

Although various examples of HARQ schemes have been described as above, HARQ is characterized in that the receiving side stores a frame in a buffer for a certain time period, wherein the frame cannot be decoded, independent of NACK transmission to the transmitting side due to reception of the frame that cannot be decoded, and if the same frame is retransmitted, combines the stored frame with the retransmitted frame to perform demodulation. Accordingly, the embodiment of the present invention is not limited to a specific kind of HARQ.

Next, a controller 520 of the transmitting apparatus controls a data processor 510 to perform the first data processing for initial data, controls the data processor 510 to perform the second data processing for the same data if NACK message is arrived from the receiving side as the initial data is not normally received in the receiving side or if ACK message is not arrived for a certain time period, and controls a transmitting unit 530 to transmit the data processed by the first data processing or the data processed by the second data processing to the receiving side.

The transmitting unit 530 of the transmitting apparatus serves to transmit initial data to the receiving side or retransmit the same data to the receiving side.

Figure 7:
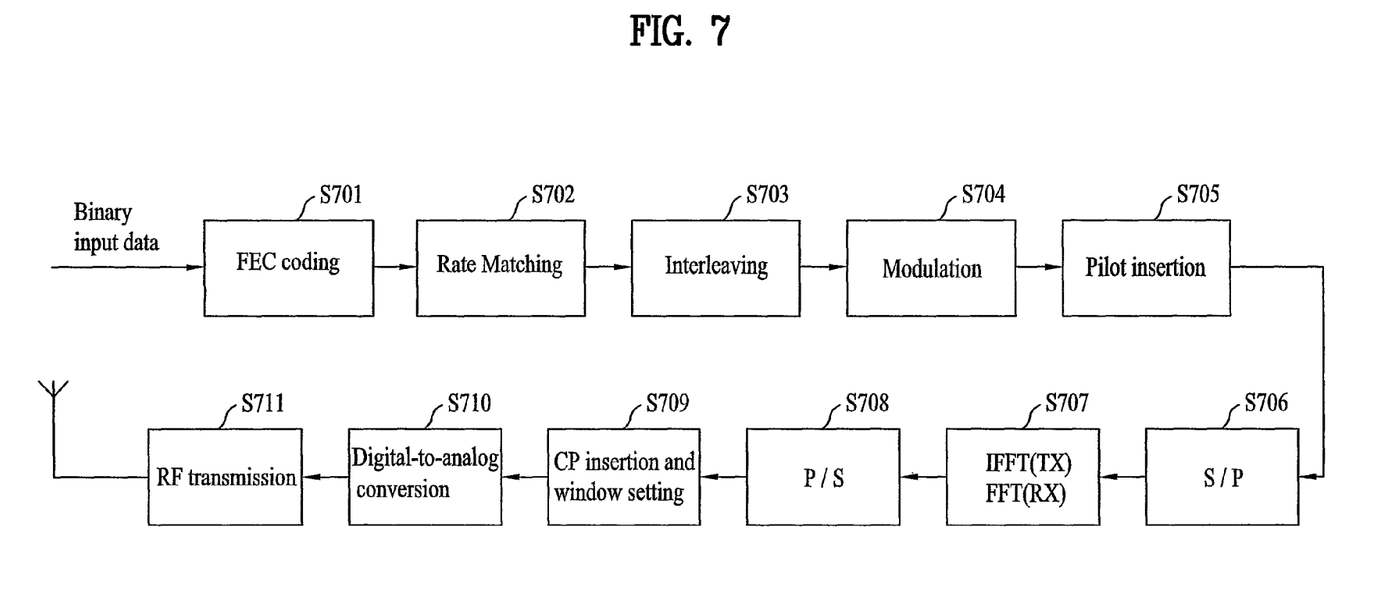
FIG. 7 illustrates a data transmission procedure in an OFDM transmitting apparatus to which HARQ is applied.

The embodiment of the present invention is based on an orthogonal frequency division multiplexing (OFDM) system, and the data transmission procedure in the OFDM transmitting apparatus to which HARQ is applied is shown in FIG. 7. The main procedure related to the embodiment of the present invention will be described.

The transmission data undergoes forward error correction (FEC) coding (S701) for stable transmission. A data stream coded through FEC coding forms HARQ sub-packet consisting of code data selected through rate matching (S702) or Tx coded bit selection. Afterwards, the selected code data are rearranged through interleaving (S903), and then transmitted to the receiving side through symbol modulation procedure (S704) such as QPSK, 16QAM or 64QAM and orthogonal frequency division multiplexing modulation procedures (S705 to S711). In the data transmitting apparatus according to the embodiment of the present invention, as shown in FIG. 5A, the data processor 510 performs the step S703, the transmitting unit 530 performs the other steps, and the controller 520 performs control operation to allow each procedure to be desirably performed.

Next, the receiving apparatus for realizing the data retransmission method according to the embodiment of the present invention will be described.

A data processor 540 of the receiving apparatus performs third data processing and fourth data processing to perform decoding through code rearrangement. In this case, the third data processing and the fourth data processing mean that de-interleaving is performed in response to interleaved data transmitted from the transmitting side. De-interleaving is generally performed in reverse order of interleaving.

A controller 550 of the receiving apparatus controls the data processor 540 to perform the third data processing for the initial data transmitted from the transmitting side, and if decoding is not performed normally due to damage of initial data during transmission in spite of the third data processing, controls the data processor 540 to transmit NACK message to the transmitting side or to perform the fourth data processing for retransmission data if the retransmission data is arrived from the transmitting side after standby until the same data is retransmitted from the transmitting side.

Furthermore, the controller 550 controls a receiving unit 560 and the data processor 540 so that reception of retransmission data and the fourth data processing are repeated until decoding of the corresponding data is performed normally. Particularly, the controller 550 controls the data processor 540 to change a de-interleaving pattern for the fourth data processing whenever the fourth data processing is repeated. Accordingly, the receiving apparatus of the present invention should be provided with de-interleaving algorithms of various patterns, and is preferably provided with a predetermined scheduling policy to change each de-interleaving pattern. Also, the scheduling policy should be set in the same manner as that of the transmitting apparatus. If a separate scheduling policy is not provided in the receiving apparatus, the receiving apparatus may receive pattern change information of interleaving from the transmitting apparatus to determine the de-interleaving pattern referring to the received pattern change information of interleaving.

The receiving unit 560 of the receiving apparatus receives the initial data or the retransmitted data under the control of the controller 550.

Meanwhile, the data transmission procedure in the OFDM receiving apparatus to which HARQ is applied corresponds to a reverse order of the data transmission procedure in the OFDM transmitting apparatus described with reference to FIG. 5, and data processing corresponding to each step of the data transmission procedure in the OFDM transmitting apparatus is performed (for example, de-interleaving is performed to correspond to interleaving and demodulation is performed to correspond to modulation). Accordingly, the detailed description of the data transmission procedure in the OFDM receiving apparatus will be omitted.

Figure 8:
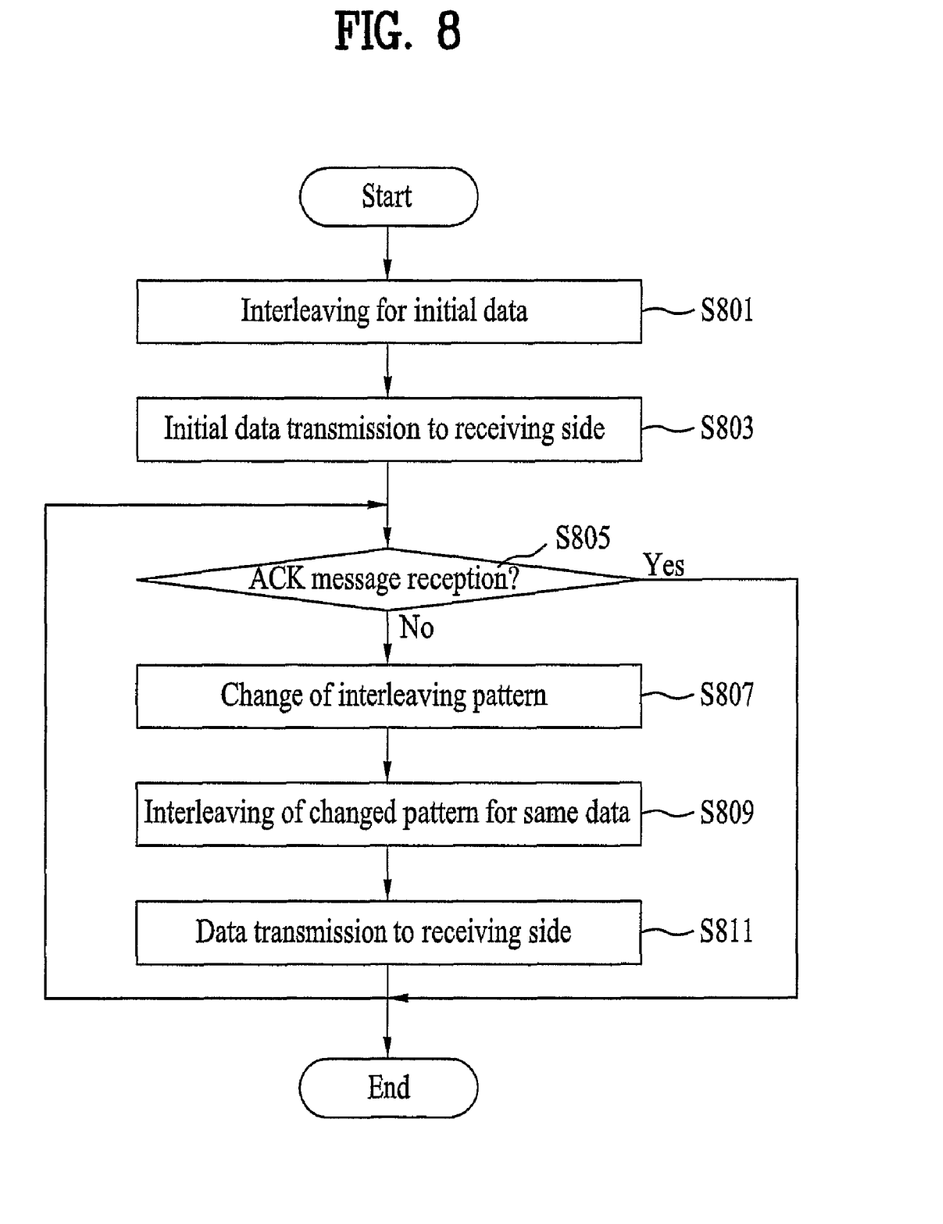
FIG. 8 is a flow chart illustrating a procedure of performing data retransmission in a transmitting apparatus according to one embodiment of the present invention.

Hereinafter, the data retransmission procedure between the transmitting apparatus and the receiving apparatus will be described in detail, and it is assumed that interleaving and de-interleaving are used for data processing to minimize instantaneous noise loss. FIG. 8 is a flow chart illustrating a procedure of performing data retransmission in the transmitting apparatus according to the embodiment of the present invention.

The transmitting side performs interleaving for the initial data (S801), and transmits the interleaved data to the receiving side (S803). If the receiving side receives the initial data normally, the receiving side transmits ACK to the transmitting side. If the receiving side does not receive the initial data normally as the transmission data frame is damaged or lost due to various factors during transmission, the receiving side transmits NACK to the transmitting side. The receiving side may not transmit NACK to the transmitting side even though the initial data is not received in the receiving side normally. In this case, if ACK is not arrived until a predetermined time passes after the step S803, the transmitting side regards that NACK is arrived.

If NACK is received from the receiving side (S805), it means that the initial data is not normally received in the receiving side. Accordingly, the transmitting side changes a pattern of interleaving (S807), performs interleaving of the changed pattern for the same data as the initial data (S809), and retransmits the interleaved data to the receiving side (S811). The reason why the transmitting side changes the pattern of interleaving is to minimize loss of instantaneous noise for the retransmitted data and allocate different code streams to a frequency domain per retransmission when the receiving side uses HARQ, thereby facilitating data restoration. In this case, the frequency domain corresponds to a part where deep fading occurs. Such retransmission steps S805 to S811 are repeatedly performed until the corresponding data is normally received in the receiving side.

Figure 9:
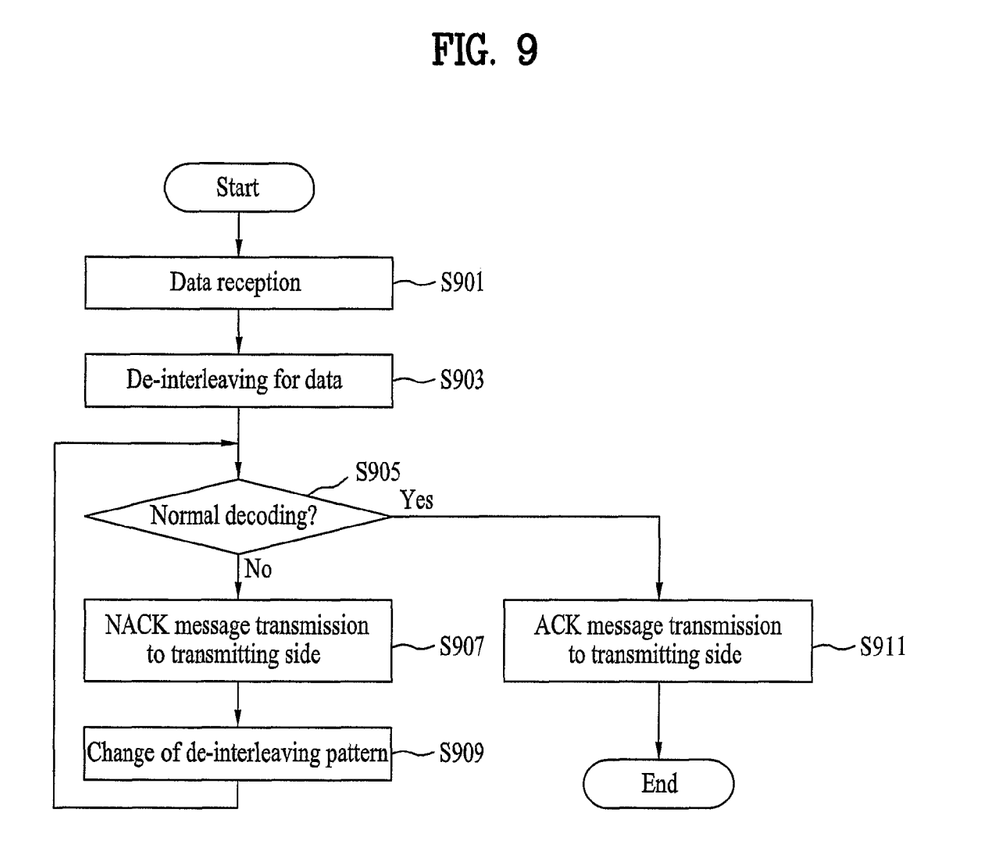
FIG. 9 is a flow chart illustrating a procedure of performing data retransmission in a receiving apparatus according to one embodiment of the present invention.

Next, the data retransmission procedure of the receiving side will be described. FIG. 9 is a flow chart illustrating a procedure of performing data retransmission in the receiving apparatus according to the embodiment of the present invention.

If the initial data is received from the transmitting side (S901), the receiving side performs de-interleaving for the corresponding initial data to restore the code streams to their original order (S903) and then performs demodulation. If the receiving side cannot perform demodulation successfully due to damage of the initial data during transmission (S905), the receiving side transmits NACK to the transmitting side to indicate failure of data transmission (S907). Then, the receiving side changes a pattern of de-interleaving (S909) and waits for retransmission from the transmitting side. The step S909 is to adapt to changing a pattern of interleaving during data retransmission from the transmitting side, and to avoid concentration of specific code streams in the frequency domain where deep fading occurs in applying HARQ to data in which error occurs, as described above. The data receiving steps S901 to S909 are repeatedly performed until the receiving side can demodulate the corresponding data normally.

Meanwhile, if the initial data is transmitted without loss to directly enable demodulation or demodulation can be performed by HARQ at the end of the repeated retransmission (S905), the receiving side transmits ACK message to the transmitting side (S911) and ends the data receiving procedure.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a wire communication system which uses a retransmission method such as ARQ and HARQ, as well as a wireless communication system such as a mobile communication system or a wireless Internet system.

The invention claimed is:

1. A communication method according to an automatic repeat request scheme in a mobile communication system, the method comprising:
   transmitting a first retransmission packet periodically per a time period in response to a first negative acknowledgement (NACK) from a first user equipment for a first packet transmitted within a frame group comprising a plurality of successive frames; and
   transmitting a second retransmission packet non-periodically in response to a second NACK from a second user equipment for a second packet transmitted within the frame group.

2. The method of claim 1, further comprising transmitting control information for the second packet and the second retransmission packet to the second user equipment before transmitting the second packet and the second retransmission packet, respectively.

3. The method of claim 2, wherein the control information includes an identifier of the second user equipment and transmission formats of the second packet and the second retransmission packet.

4. The method of claim 1, further comprising transmitting control information of the first packet to the first user equipment before transmitting the first packet.

5. The method of claim 1, further comprising notifying user equipments of indication information of a frame within which the first retransmission packet will be transmitted periodically and a frame within which the second retransmission packet will be transmitted non-periodically.

6. The method of claim 5, wherein the indication information is notified through upper layer signaling.

7. The method of claim 5, wherein the frame within which the first retransmission packet will be transmitted periodically and the frame within which the second retransmission packet will be transmitted non-periodically are designated for each user equipment.

8. The method of claim 5, wherein the frame within which the first retransmission packet will be transmitted periodically and the frame within which the second retransmission packet will be transmitted non-periodically are designated in common for all user equipments in which connection is currently set.

9. The method of claim 5, wherein the frame within which the first retransmission packet will be transmitted periodically and the frame within which the second retransmission packet will be transmitted non-periodically are designated for a certain group of all user equipments in which connection is currently set.

10. The method of claim 1, wherein the time period is the same as a length of the frame group.

11. The method of claim 1, wherein the first user equipment and the second user equipment are the same entities.

12. The method of claim 1, wherein the automatic repeat request scheme is a hybrid ARQ (HARQ) scheme.

13. A communication method according to an automatic repeat request scheme in a mobile communication system, the method comprising:

transmitting a first negative acknowledgement (NACK) to a base station in response to a first packet received within a frame group including a plurality of successive frames;
transmitting a second NACK to the base station in response to a second packet received within the frame group;
receiving a first retransmission packet which is periodically retransmitted for the first packet after a lapse of a certain time period;
receiving control information for a second retransmission packet for the second packet; and
receiving the second retransmission packet which is non-periodically retransmitted for the second packet by using the control information.

14. The method of claim 13, wherein the first packet is a packet for voice communication.

15. The method of claim 13, wherein the control information includes a user equipment identifier and a transmission format of the second retransmission packet for the second packet.

16. A communication method according to an automatic repeat request scheme in a mobile communication system, the method comprising:

transmitting a packet to a receiving side;
receiving a first negative acknowledgement (NACK) from the receiving side in response to the packet; and
transmitting a retransmission packet to the receiving side in response to the first NACK, the retransmission packet transmitted periodically per certain time period for at least one frame within a frame group including a plurality of successive frames;
receiving a second NACK from the receiving side; and
transmitting a retransmission packet non-periodically in response to the second NACK for at least one other frame within the frame group.

* * * * *